Patented Apr. 18, 1939

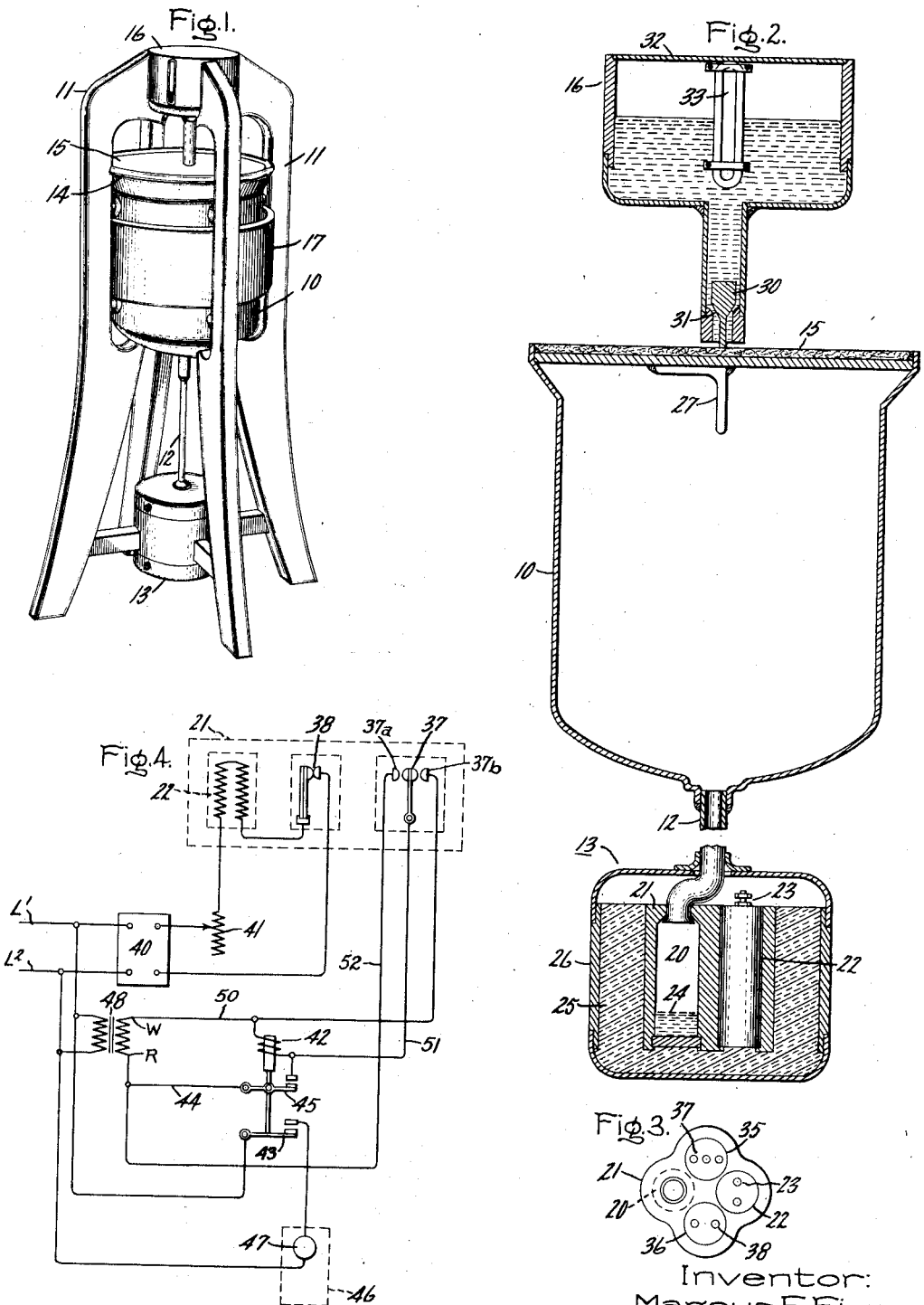

2,155,262

UNITED STATES PATENT OFFICE 2,155,262

COMFORT RESPONSIVE APPARATUS

Marcus E. Fiene, Ballston Lake, N. Y., assignor to General Electric Company, a corporation of New York Application November 8, 1935, Serial No. 48,850

2 Claims. (Cl. 236—68)

The present invention relates to apparatus for use in air conditioning work and the object is to provide improved apparatus for responding to the resultant of the principal environmental conditions which affect human comfort such as air temperature, air movement, radiant heat, humidity and the like. In accomplishing this object, the improved apparatus is proportioned to dissipate heat to its environment at a predetermined normal rate in essentially the same manner as the normal human being and is arranged to cause a thermal responsive device to respond upon variation from the combined environmental conditions best suited to human comfort.

The invention utilizes the fact disclosed by physiological investigation that heat is dissipated by the normal adult human being under average environmental comfort conditions at a rate from 20 to 30 B. t. u.'s per hour per square foot of body surface with the body (19.5 sq. ft. of surface area) at a substantially constant temperature of about 98.6° F. It should be understood, however, that the exact amount of heat dissipated will vary considerably with the state of health, age, sex, clothing and degree of activity and acclimation of the individual. In addition, the relative percentages of the total body heat dissipated by radiation, convection, and evaporation will vary greatly upon relative variation in the different environmental conditions within the normal comfort zone range. Thus, in applying the invention, the sensation of human comfort in so far as the actual physical environmental factors are concerned, is never absolute but varies considerably. Still for any combination within wide limits of humidity, air movement and radiant heat, there is always some dry bulb air temperature which will give a resultant combination best suited to human comfort. Nevertheless, the dry bulb air temperature is only one factor affecting human comfort. Hence, the ordinary heating control thermostat which responds solely to variations in dry bulb air temperature from some arbitrarily selected value leaves much to be desired in the way of actual comfort control.

Thus a special object of the present invention is to provide an improved comfort compensated thermostat for controlling dry bulb air temperature so as to provide a resultant combination with other existing comfort factors best suited to human comfort.

In the preferred form of the invention, electrical means is provided for generating heat at a constant predetermined rate and at a temperature appreciably above the normal body temperature, i. e., 98.6° F. The heat generated is supplied to a substantially constant temperature heat dissipating system having a heat dissipating element which is exposed to the existing environmental conditions. The rate of heat supply to the exposed heat dissipating element is proportioned so that when this element is dissipating heat at a rate substantially equivalent to the rate of heat dissipation of the normal human body under the combination of environmental conditions best suited to human comfort, i. e., about 20 to 30 B. t. u.'s per hour per square foot, the temperature of the surface of the heat dissipating element will be maintained at a predetermined normal value somewhat below normal body temperature, i. e., 98.6° F., but still above the ordinary comfortable dry bulb air temperature, i. e., 68° F. to 78° F. Preferably, the substantially constant temperature heat dissipating apparatus is of the vapor type disclosed and claimed in my Patent No. 2,026,423 of December 31, 1935.

In order to obtain the equivalent heat dissipating characteristics of the human body, preferably a portion of the exposed surface of the heat dissipating element is provided with a porous heat insulating covering to restrict the dissipation of heat therefrom, and another portion is blackened so as readily to absorb radiated heat and preferably in addition a wetted wick is located in contact with still another portion of the exposed surface to compensate the heat dissipating characteristics thereof for variations in the humidity of the ambient air. In this way, the relative percentages of the total human body heat dissipated by convection, radiation, and evaporation may be substantially reproduced by the heat dissipating element.

The constant temperature device of my patent mentioned above consists essentially of a fluid vaporizer connected with a fluid condenser. When used in the present invention, the condenser serves as the heat dissipating element which is maintained at a constant temperature and exposed to the existing environmental conditions. The entire vapor system is exhausted and charged with the predetermined amount of vaporizable liquid required to maintain the temperature of the condenser surface constantly at the desired value with practically all of the liquid vaporized. With the various parts of the apparatus properly proportioned, the dissipation of heat from the exposed surface of the constant temperature condenser by radiation, convection, and evaporation will be substantially the same within the normal comfort range of environmental conditions as the heat input to the vaporizer less any incidental heat loss from the vaporizer which, however, is well heat insulated. In other words, with a constant heat input of proper value, the heat generating and dissipating systems will be maintained at a predetermined thermal equilibrium and the temperature of the vaporizer will remain unchanged as long as the resultant combination of environmental conditions remains unchanged. However, upon variation of the resultant combination of environmental factors as by excessive variation in dry bulb air temperature, radiant heat, relative humidity, or air movement, the rate of condensation of the vapor in the condenser will vary from the normal equilibrium value. Consequently, the thermal equilibrium of the system becomes unbalanced so that the constant rate at which heat is supplied to the vaporizer becomes either greater or less than the rate of heat dissipation from the condenser. In the first case, the temperature of the vaporizer will rapidly increase due to the accumulation of excess heat and in the latter case the temperature of the vaporizer will rapidly decrease due to the deficit of heat supply. Consequently, a main control thermal responsive device which is made responsive to the temperature of the vaporizer will operate very quickly to indicate the departure from the heat equilibrium properly existing under normal comfort conditions. Since the excess or deficit of heat is always cumulative, the change in temperature of the condenser due to the excess or deficit of heat is amplified materially over the change in ambient temperature or other factors affecting the heat dissipating surface of the condenser. With proper design this amplification may be made very large so as to provide a very quick and accurate response to slight variations in ambient temperature or other factors at the surface of the heat dissipating condenser.

In the accompanying drawing, Fig. 1 is a perspective view of a preferred form of comfort responsive apparatus embodying the improvements of the present invention; Fig. 2 is a sectional view of the device shown in Fig. 1; Fig. 3 is a top view of the heat generating and vaporizing unit of the device of Fig. 2; Fig. 4 is a diagram showing a preferred form of electrical circuit control for the device shown in Fig. 1 when used as a comfort compensated control thermostat for a heating device.

While it will be understood that the principle of the present invention may be carried out in other ways, the preferred form of comfort responsive apparatus illustrated in Fig. 1 comprises a heat dissipating body 10 which is in the form of a hollow thin walled closed vessel or vapor condenser mounted within the four supporting legs 11 so as to be exposed on all sides to the atmosphere and thereby rendered freely responsive to ambient air temperature, air movement and radiant heat. The interior of the hollow heat dissipating body 10 is connected by the tube 12 to the heat generating or vaporizing apparatus 13. Preferably, the upper exposed surface of the heat dissipating body 10 is made flat with an upstanding rim 14 so as to receive a suitable wick 15 which is automatically maintained in a wetted condition by means of the automatic water feed reservoir 16. The vertical cylindrical portion of the heat dissipating body 10 preferably is provided with a band of felt or other suitable porous heat insulating material 17 so as to shield a considerable portion of the bare surface of the body 10 exposed to the ambient conditions, preferably the shielded portion being about 30 per cent of the total area.

As more clearly shown in the sectional view of Fig. 2, the hollow heat dissipating body 10 is formed with an inverted bell shaped bottom having the restricted tube 12 extending downwardly therefrom so as readily to drain condensed vapor from the body 10 into the vaporizing chamber 20 of the heat generating apparatus 13. The vaporizing chamber 20 is formed in a block 21 of good heat conducting metal such as brass or copper which also is provided with a chamber 22 for receiving the electric heat generating unit 23 in good heat transfer relation with the vaporizing chamber.

The hollow heat dissipating body 10, tube 12 and the vaporizing chamber 20 constitute a closed hermetically sealed vapor system of the constant temperature type described and claimed in my copending application mentioned above. This system is evacuated to a very low pressure and charged with a predetermined quantity of suitable vaporizable liquid 24 such as dichlor difluor methane or the like. This insures that the body 10 is always maintained at a substantially constant predetermined temperature as long as substantially all of the liquid is maintained in the vapor phase. This temperature preferably is made less than the normal temperature of the human body, i. e., 98.6, but still above the ordinary comfortable dry bulb air temperatures, as for example, 85 to 91° F. The metal block 21 is surrounded by a sufficient layer of heat insulating material 25 so that the heat losses therefrom are reduced to the minimum. This heat insulating material is enclosed within the outer metal casing 26 which surrounds the block 21.

Since the heat dissipating body 10 is evacuated and hence initially under low internal pressure, and also may become subject to relatively high internal pressure under operating conditions, a strengthening rib 27 is extended transverse the flat upper surface thereof to prevent deformation of this surface. The wick 15 is formed of absorbent paper or other suitable material adapted to be wetted from the water reservoir. Preferably the exposed wick area is from 14 to 21 per cent of the total area of body 10. Water is supplied to keep the wick 15 moist from the removable water reservoir 16. The valve 30 is opened to fill the reservoir and is raised slightly from the seat 31 when the reservoir is in proper position above the wick to feed water thereto. A suitable transparent window 33 is provided in the side of the reservoir 16 so that the level of the water therein may be observed.

As more clearly shown in Fig. 3, the metal block 21 containing the electric heat generator 23 is also provided with the two chambers 35 and 36 formed preferably between the heat generating chamber 22 and the vaporizing chamber 20. The main control temperature responsive thermostat 37 is located in the chamber 35 and an auxiliary excess temperature thermostat 38 is located in the chamber 36. As diagrammatically shown in Fig. 4, thermostat 37 is of the double contact bimetallic type and thermostat 38 is of the single contact bimetallic type. It will be understood that these thermostats as well as all other parts associated with block 21 are entirely surrounded by the insulating material so as to be directly responsive to the temperature conditions existing in the block 21.

In the preferred form of electrical circuit control arrangement shown in the diagram of Fig. 4, the electric heat generating element 22 is in the form of a resistance supplied with current from the supply lines L1, L2. A suitable form of constant current control device 40, such as a constant current transformer or a ballast resistor, preferably is provided for maintaining the heat generating action of the element 22 at a substantially constant rate irrespective of variations in the supply line voltage. A suitable manually operable rheostat 41 is provided for adjusting the current of the heat generating element 22 to provide for generation of heat at a desired rate. The excess temperature thermostat 38 is provided for interrupting the circuit of the heat generating element 22 in case the temperature of the block 21 ever reaches a dangerously high value. The main comfort compensated thermostat 37 is connected to control the operation of the electroresponsive relay 42, which preferably is energized from the low voltage winding of the transformer 48 having the primary winding thereof energized from lines L1 L2. The main contact 43 of the relay 42 may be employed to control the energizing circuit of any electrically operated means suitable for varying the environmental conditions to which the thermostat 37 is responsive. For example, Fig. 4 diagrammatically shows the comfort compensated thermostat 37 employed to control the operation of a house heating device such as an oil furnace 46 having an operating electric motor 47. In such service, the comfort responsive device shown in Fig. 1 having thermostat 37 may be located in a room heated by operation of furnace 46 and connected to control the motor circuit in substantially the same way as the ordinary room thermostat.

The operation of the preferred form of comfort responsive device constructed to embody the improvements of the present invention and connected in the manner previously described is as follows: Heat is generated at a constant normal rate by the electrical heat generating unit 22, the rate being determined by adjustment of resistor 41. This heat is conducted through the metal block 21 to the vaporizing chamber 20. With heat being generated at the constant normal rate, the temperature of the block 21 will vary as an amplified function of the variations in the rate of heat transfer from block 21 to the heat dissipating body 10. The surface area of the heat dissipating body 10 and the charge of liquid in the sealed vapor heat transfer system are so proportioned that the surface of the body 10 preferably is maintained at a constant temperature somewhat below normal body temperature, i. e., 98.6° F., when a normal heat transfer equilibrium is established between the heat generating and heat dissipating systems with the body 10 exposed to the combination of environmental conditions best suited for human comfort and dissipating heat to such environment at a rate of about 20 to 30 B. t. u.'s per hour per square foot. Under this condition, the temperature of the block 21 is normally well above the normal body temperature as, for example, between 150° F. and 200° F.

Under the normal heat equilibrium condition just described, the total heat dissipated from the body 10 will always equal the total heat generated by the electrical heat generating unit 22 less the heat losses from the block 21. These losses, however, may be reduced to a relatively low value by means of the heat insulation around the block. Hence, the major portion of the heat generated in the unit 22 will be transferred through the block 21 to vaporize liquid in the chamber 20. The vapor passes through the tube 12 into the interior of the heat dissipating body 10 and there condenses to effect transfer of the heat of vaporization to the walls of the body 10. This heat is dissipated at a rate dependent upon the existing environmental conditions. The condensed fluid is continually returning by gravity into vaporizing chamber 20 to be revaporized. Substantially all of the liquid is in the vapor phase, and the amount of liquid is proportioned so that the temperature of the body 10 will always be maintained at a selected value which, as previously pointed out, is preferably somewhat below body temperature, i. e., 98.6° F.

Under the normal heat equilibrium condition noted, the block 21 will have a predetermined normal temperature value, i. e., that value required to provide a rate of heat loss which just balances the difference between the rate of heat generation in unit 22 and the rate of heat dissipation of body 10. The main control thermostat 37 is adjusted so that the movable contact thereof will be maintained in the mid-position between the contacts 37a and 37b as long as the block 21 remains at such normal temperature value.

When ever the combination of environmental conditions of the heat dissipating body 10 varies outside of the range best suited for human comfort, the rate of heat dissipation therefrom will vary correspodingly. Such variation in the rate of heat dissipation from the body 10 will automatically produce a corresponding variation in the rate of heat transfer from block 21. Since heat is being generated at a constant rate, variation in the rate of heat dissipation will quickly result in an amplified variation in the temperature of block 21 due to the excess or deficit of heat generated until a new heat equilibrium condition is established by an increase or decrease in the rate of heat loss from the block. The main control thermostat 37 will be quickly responsive to the amplified variation in temperature of the block 21.

In case the rate of heat dissipation from body 10 increases from the normal value due to variation of the environmental conditions outside the comfort range, the temperature of block 21 will rapidly decrease. In response thereto, the movable thermostat contact 37 will engage with the stationary contact 37a to complete an energizing circuit for the electromagnetic switch 42. This circuit extends from the terminal W of transformer 48 through conductor 50, the energizing winding of electromagnetic switch 42, conductor 51, the movable thermostat contact 37, contact 37a, conductor 52, to the other terminal R of the transformer. Thereupon, the switch 42 operates contact 43 to close the energizing circuit of the electric motor 47 from supply lines L1L2. This starts operation of the burner mechanism of the furnace 46 to supply heat to the space surrounding the heat dissipating body 12 and thereby return the combination of environmental conditions to the comfort range. Upon energization of electromagnet 42, auxiliary contact 45 is operated from the open position to close a holding circuit for the electromagnet.

When the combination of environmental conditions surrounding the dissipating body 10 varies so that the rate of heat dissipation therefrom decreases below the normal value, then the temperature of block 21 will rapidly increase. The thermostat 37 will at once respond to the increased temperature of the block 21 and engage contact 37b. As a result, the operating winding of the electromagnet 42 will be short-circuited, thereby de-energizing the electromagnet. Contact 43 will open and de-energize the motor operated burner mechanism 47 of the furnace 46. This will result in stopping the supply of heat to the environment in which the comfort compensated thermostat is located so as to return the environmental conditions of the comfort compensating thermostat within the comfort range.

Since the rate of heat dissipation from the heat dissipating body 10 is not dependent solely upon ambient temperature conditions, but is compensated for humidity, air movement, and radiant heat effects, it follows that the operation of the furnace 46 will be controlled so as to provide a combination of ambient temperature with the other existing environmental conditions best suited for human comfort.

While a preferred embodiment of the improved comfort compensating thermostat of the present invention has been specifically illustrated and described in heating control service, it will be understood that the improvements of the present invention may be applied with equal advantage in other forms of thermostats and in other comfort control service whenever desired.

What I claim as new and desire to secure by Letters Patent of the United States is:

1. In a comfort responsive apparatus, the combination of a body for dissipating heat to its environment at a rate dependent upon the resultant of a plurality of environmental conditions, means for continuously generating heat at a substantially constant rate, a sealed vaporizing and condensing heat transfer means interconnected between the heat generating means and the heat dissipating body and having a vaporizer maintained at a predetermined temperature materially above the temperature of said body when said body is dissipating heat under environmental conditions within the comfort range, and means responsive to variations in said temperature of said vaporizer.

2. A comfort compensated thermostat comprising a metal body having a vaporizing chamber for liquid formed therein, a temperature responsive device responsive to the temperature of said body, a heat insulating enclosure for said body, a vapor condensing chamber disposed remotely from said body and having a restricted conduit communicating with said vaporizing chamber, means for rendering the rate of heat dissipation from said condensing chamber dependent upon the resultant of a plurality of environmental conditions and an electrical heater for continuously supplying heat to said body at a constant rate sufficient to vaporize all the liquid in said vaporizing chamber under widely varying environmental conditions.

MARCUS E. FIENE.